United States Patent [19]

Binder-Kriegelstein

[11] Patent Number: 4,897,745
[45] Date of Patent: Jan. 30, 1990

[54] METHOD OF ADJUSTING THE GAPS OF TWO MAGNETIC HEADS ARRANGED ON ONE HEAD DISC, AND HEAD DISC CARRYING TWO MAGNETIC HEADS

[75] Inventor: Wolfgang Binder-Kriegelstein, Vienna, Austria

[73] Assignee: U.S. Philips Corp., New York, N.Y.

[21] Appl. No.: 130,758

[22] Filed: Dec. 9, 1987

[30] Foreign Application Priority Data

Dec. 10, 1986 [AT] Austria ................................ 3278/86

[51] Int. Cl.⁴ .............................................. G11B 5/56
[52] U.S. Cl. ..................................... 360/109; 360/104
[58] Field of Search ................... 360/109, 85, 107, 95, 360/104, 130.21, 130.24

[56] References Cited

U.S. PATENT DOCUMENTS

| | | | |
|---|---|---|---|
| 4,314,296 | 2/1982 | Whittle | 360/109 |
| 4,497,005 | 1/1985 | Heinz | 360/109 |
| 4,672,489 | 6/1987 | Wada et al. | 360/104 |
| 4,709,287 | 11/1987 | Yamashita | 360/130.24 X |
| 4,768,117 | 8/1988 | Mihara | 360/109 |

FOREIGN PATENT DOCUMENTS 0105719 5/1986 Japan .................................. 360/109

Primary Examiner—A. J. Heinz
Assistant Examiner—David J. Severin
Attorney, Agent, or Firm—William L. Botjer

[57] ABSTRACT

In accordance with a method of adjusting the gaps of two magnetic heads (11, 12) which are arranged on a head disc (4) adjacent. One end portion of a supporting plate (6) is provided with a slot to form two limbs (9, 10) which project from a basic portion (8) of the supporting plate and whose free ends each carry one of the two magnetic heads on coplanar major surfaces (13, 14) of the limbs, after which the supporting plate is secured to the head disc with its basic portion. The gap length centers of both magnetic heads on the supporting plate are first brought to the same level (b) relative to a reference surface constituted by the major surface (17) of the basic portion of the supporting plate and subsequently, after the supporting plate has been secured to the head disc, they are together adjusted to a predetermined level (d) relative to the head disc by bending the basic portion of the supporting plate by means of a set-screw (46) which acts between the basic portion of the supporting plate and the head disc.

4 Claims, 2 Drawing Sheets

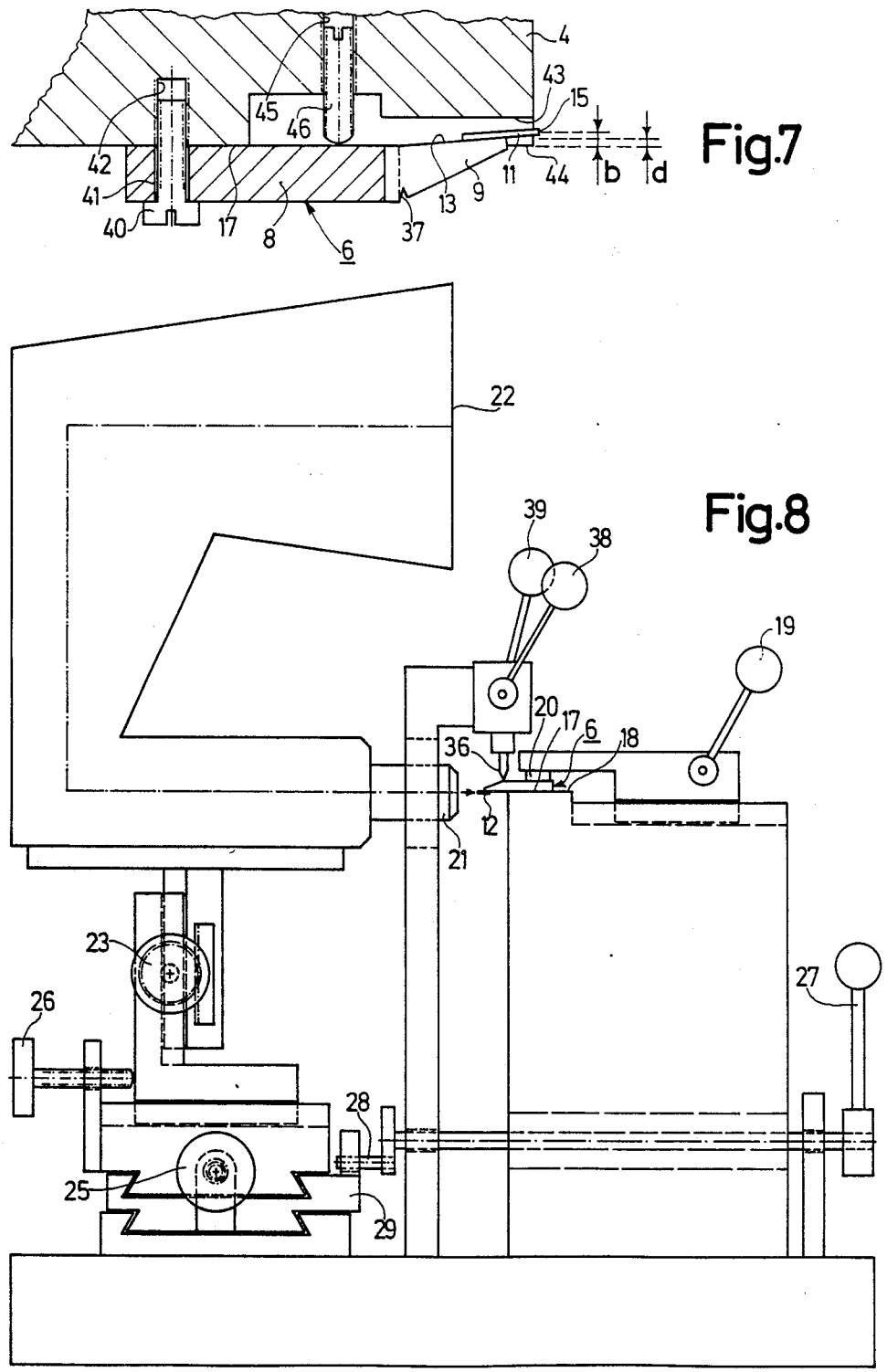

METHOD OF ADJUSTING THE GAPS OF TWO MAGNETIC HEADS ARRANGED ON ONE HEAD DISC, AND HEAD DISC CARRYING TWO MAGNETIC HEADS

BACKGROUND OF THE INVENTION

The invention relates to a method of adjusting the gaps of two magnetic heads arranged on one head disc, which heads are disposed adjacent to one another in one plane and by means of a common supporting plate are arranged on a head disc which is rotatable in operation. One end portion of the supporting plate is provided with a slot to form two limbs which project from a basic portion of the supporting plate and whose free ends carry one of the two magnetic heads arranged on the same major surfaces of the limbs.

The supporting plate is secured to the head disc with its basic portion after which the gap-length centers of the two magnetic heads are adjusted to be situated at a predetermined level relative to the head disc. DE-OS 31 21 791 describes a supporting plate comprising a basic portion from which two limbs project whose free ends each carry one of the two magnetic heads on the same major surfaces of the limbs, which limbs are each formed with a threaded bore in which a set screw is fitted to cooperate with the head disc for the purpose of adjusting the gap-length centers to a predetermined level relative to a head disc. The basic portion of the supporting plate serves for securing the supporting plate to the head disc. In this way the positions of the gaps of the two magnetic heads can each be adjusted separately. Such a head disc, which can be rotated during operation and which carries two magnetic heads, serves for recording or reproducing signals in/from very narrow adjacent tracks on a record carrier in the form of a tape. Therefore, as is known, the dimensions of such magnetic heads and hence these of the supporting plate with the two adjacent limbs are relatively small. Providing two set-screws situated close to one another and each acting between one of the two limbs and the head disc gives rise to construction problems because of the room available as a result of the small size of the supporting plate and its limbs, whilst moreover a very high adjustment accuracy is required.

SUMMARY OF THE INVENTION

According to the invention that the distances between the gap-length centers of the two magnetic heads arranged on the limbs of the supporting plate and a major surface of the basic portion of the supporting plate, which major surface constitutes a reference surface and corresponds in level to the major surfaces of the limbs of the supporting plate which carry the magnetic heads, are measured to determine the magnetic head with the smaller distance. The basic portion of the supporting plate is then retained and a notching tool exerts pressure on the transition between the limb carrying the magnetic head with the smaller distance and the basic portion of the supporting plate from the side which is remote from the magnetic head to offset substantially the entire limb until the gap-length center of the magnetic head on the limb is situated at the same level as the gap-length center of the magnetic head on the other limb. The supporting plate, with the major surface of the basic portion which constitutes the reference surface facing the head disc, is subsequently secured to the head disc in that area of the basic portion which is substantially remote from the limb. By means of a set-screw acting between that area of the basic portion of the supporting plate which is substantially remote from the limbs and the head disc, the area of the basic portion of the supporting plate is then bent to adjust both magnetic heads with their gap-length centers together to the predetermined level relative to the head disc. In this way the gap-length centers of the two magnetic heads are first brought to the same level relative to a reference surface to the basic portion of the supporting plate. After the supporting plate has been mounted on the head disc the heads are together adjusted to the predetermined level with respect to the head disc by means of one set-screw which acts between the basic portion and the head disc. This requires the use of only one set-screw which cooperates with the basic portion of the supporting plate, which basic portion has a larger surface area than the two limbs so that no constructional problems arise because of the limited room. Such a method provides a very accurate adjustment of the gaps to the predetermined level relative to the head disc.

The invention further relates to a head disc carrying two magnetic heads which are situated adjacent one another in one plane and which by means of a common supporting plate are arranged on a head disc which is rotatable in operation. The gap-length centers of the gaps of both magnetic heads are adjusted to a predetermined level relative to the head disc by means of the inventive method described above.

BRIEF DESCRIPTION OF THE DRAWING

FIG. 7 shows a head disc provided with the supporting plate of FIG. 2 in a sectional view taken on the line IV—IV in FIG. 2.

FIG. 8 is a side view of an adjusting device as used in carrying out the inventive method. It is to be noted that the drawings are not to scale because in practice the dimensions of the magnetic heads are small.

DETAILED DESCRIPTION OF THE PREFERRED EMBODIMENTS

Figure 1:
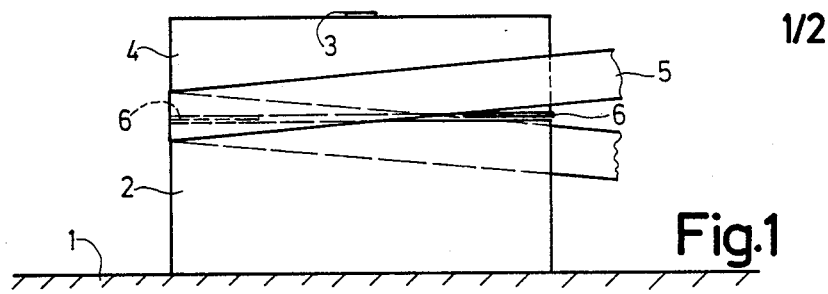
FIG. 1 is a side view showing a head disc as used in operation.

In FIG. 1 the deck plate 1 of a recording and/or reproducing apparatus carries a stationary drum 2. A head disc 4 having the same diameter as the drum 2 is clamped on a drive shaft 3, which is coaxial with this drum 2 and which can be driven by a motor. The head disc 4 is arranged on the drive shaft so as to form between this disc and the drum 2 a narrow gap where the magnetic head is arranged on the head disc 4 to cooperate with a record carrier 5 in the form of a tape of which a part is helically wrapped around the circumferential surfaces of the drum 2 and the head disc 4, the heads scanning inclined adjacent tracks on the tape. In the present case it is assumed that two diametrically opposite supporting plates 6 carrying the magnetic heads are arranged on the head disc 4. For reasons of signal processing it is often necessary that at least one supporting plate 6 carries two magnetic heads which are disposed adjacent each other in one plane and whose gap-length centers must be situated accurately at a predetermined level relative to the head disc 4 to ensure that the tracks on the record carrier are scanned correctly. Generally, adjustment facilities are needed for the magnetic heads in order to meet this requirement.

Figures 2, 3, 4:
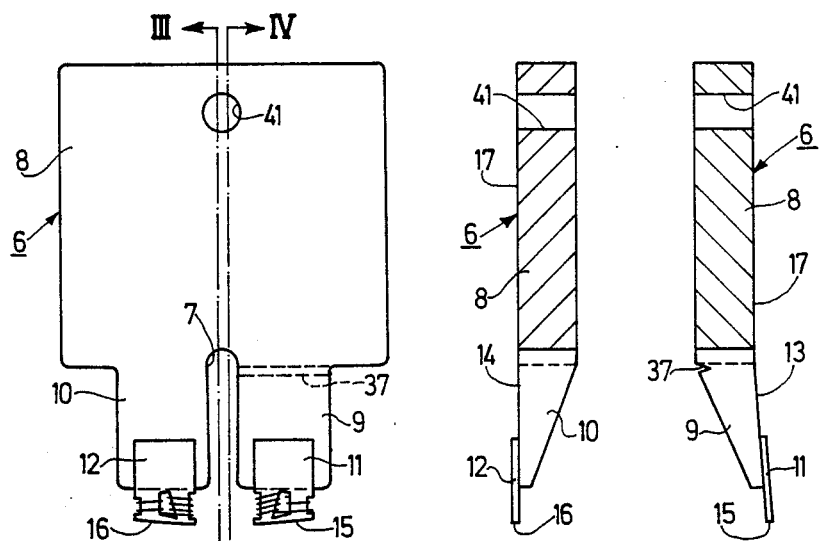
FIG. 2 is a plan view of a supporting plate comprising two limbs whose free ends each carry a magnetic head.
FIG. 3 shows the supporting plate in a sectional view taken on the line III—III in FIG. 2.
FIG. 4 shows the supporting plate in a sectional view taken on the line IV—IV in FIG. 2.

FIGS. 2, 3 and 4 show such a supporting plate 6 of which one end portion is provided with a slot 7, to form two limbs 9 and 10 which project from a basic portion 8 of the supporting plate 6 and whose free ends each carrying a magnetic head 11 and 12 respectively. The two magnetic heads 11 and 12 are arranged on the same major surfaces 13 and 14 of the limbs 9 and 10 respectively, so that they are disposed adjacent one another in one plane. The two magnetic heads 11 and 12 are of conventional construction, comprising two limbs provided with windings and forming a magnetic circuit, which limbs at their free ends form a contact face 15 and 16 respectively in which an air gap of the magnetic circuit terminates. In operation these contact faces 15 and 16 of the two magnetic heads 11 and 12 cooperate with the record carrier 5. The basic portion 8 serves for securing plate 6 to the head disc 4 and has a major face 17 situated at the same level as the major surfaces 13 and 14 of the limbs 9 and 10 on which the magnetic heads 11 and 12 are arranged. The major face 17 serves as a reference surface with which the supporting plate 6 faces the head disc and is mounted on this disc, as is shown in FIG. 7. During manufacture of the magnetic heads it may happen that the gap-length centers of their air gaps, hereinafter briefly referred to as gaps, have unequal distances relative to the reference surface constituted by the major surface 17 of the basic portion 8 of the supporting plate 6, which will be explained with reference to FIG. 5.

Figure 5:
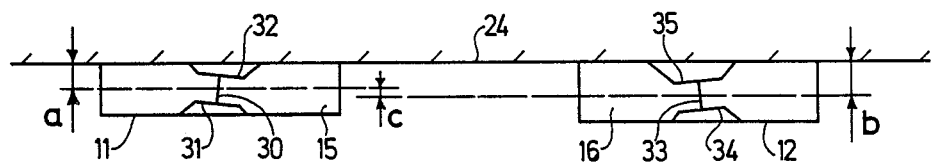
FIG. 5 is a diagrammatic plan view of the contact faces of the two magnetic heads before their gap-length centres are adjusted to the same level.

FIG. 5 is a diagrammatic view of the contact faces 15 and 16 of the two magnetic heads 11 and 12 positioned on an adjusting device as shown in FIG. 8. The supporting plate 6 is placed on a platen 18 of the adjusting device with the major surface 17 retained on the device by means of a clamping device 20 which can be actuated by a lever 19, the limbs 9 and 10 carrying the magnetic heads 11 and 12 projecting freely from the platen 18. The magnetic heads 11 and 12 are situated opposite a microscope 21, which is connected to a monitor 22 to observe their contact faces 15 and 16. By means of an adjusting device 23 the height position of the microscope 21 is adjusted until a mark is in register with the reference major surface 17 and the supporting surface of the platen 18 respectively. In FIG. 5 this reference surface is indicated by a line 24 provided with a hatching. By means of a second adjusting device 25 the microscope 21 is adjusted relative to one of the two magnetic heads 11 and 12 in a direction transverse to the heads and the image appearing on the monitor 22 is focussed by means of a third adjusting device 26. By means of an eccentric 28, which can be actuated by a lever 27 and which acts on a slide 29, the microscope 21 can be adjusted to a second position transverse to the magnetic heads in which the other magnetic head is visible.

In FIG. 5 the gap which terminates in the head face 15 of the magnetic head 11 and which, as is customary, has a predetermined azimuth angle, although this is not strictly necessary, bears the reference numeral 30, the gap length being defined in known manner by lateral recesses 31 and 32. Similarly, the gap of the magnetic head 12 bears the reference numeral 33 and the recesses bounding the gap length bear the reference numerals 34 and 35. During manufacture of the magnetic heads it may occur, for example, that the magnetic heads are not equally wide or that the lateral recesses bounding the gap length are situated at different levels from head to head although the magnetic heads have in fact the same gap length. After the magnetic heads 11 and 12 have been mounted on the limbs 9 and 10 of the supporting plate 6 this may result in the gap-length centers of these heads, briefly referred to hereinafter as gap centers, having unequal distances relative to the reference major surface 17 of the basic portion 8 of the supporting plate 6. In the present embodiment, as can be seen in FIG. 5, it is assumed that the magnetic head 11 has a smaller length than the magnetic head 12. As a result of this, the gap center of the magnetic head 11 is situated at a distance a from the reference surface represented by the line 24 and the gap center of the magnetic head 12 at a distance b from this surface, a being smaller than b. Therefore, the gap centers of the two magnetic heads 11 and 12 are situated at different levels relative to the reference surface represented by the line 24, the difference in level being equal to the difference c between a and b.

Figure 6:
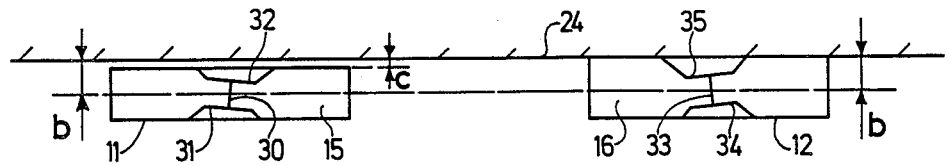
FIG. 6, in the same way as FIG. 5, shows the two magnetic heads after their gap-length centers have been adjusted to the same level.

In accordance with the present method this difference in level of the gap centers of the two magnetic heads is eliminated first. In the adjusting device shown in FIG. 8 the distances between the gap centers of the two magnetic heads 11 and 12 and the reference major surface 17 of the basic portion 8 of the supporting plate 6 are therefore measured by means of the microscope 21, to determine the magnetic head with the smaller distance. In the present case this is the magnetic head 11. While the supporting plate 6 is retained at its basic portion 8 by means of the clamping device 20, a notching tool 36 exerts pressure on the transition between the limb 9 carrying the magnetic head 11 and the basic portion 8 of the supporting plate 6 from the side which is remote from the magnetic head 11 to offset the entire limb 9 until the gap center of the magnetic head 11 on this limb is situated at the same level as the gap center of the magnetic head 12 on the other limb 10, which is ascertained by means of the microscope 21. This situation is illustrated in FIG. 6, in which the distance a relative to the reference surface represented by the line 24 is increased by the amount c, so that now the gap centers of both magnetic heads 11 and 12 are situated at a distance b from the reference surface. FIG. 4 shows that substantially the entire limb 9 is offset, a notch 37 being formed in the transition between the limb 9 and the basic portion 8 of the supporting plate 6 as a result of the pressure which is exerted by the notching tools 36 on this transition between the limb 9 and the basic portion 8 of the supporting plate 6. It is important that the limb 9 is offset substantially as a whole, in order to preclude a deformation of the major surface 13 carrying the magnetic head 11, which may result in the magnetic head being damaged.

The adjusting device shown in FIG. 8 comprises two notching tools 36 arranged one behind the other, each tool facing a transition between one of the limbs 9, 10 and the basic portion 8 of the supporting plate 6 at the side which is remote from the magnetic heads 11 and 12, and being separately operable by means of levers 38 and 39 respectively to apply the required pressure. In this way the notching tool need not be transferred to the relevant transition to which the pressure is to be applied but the notching tool facing the transition to which pressure is to be applied to bring the gap centres of the two magnetic heads at the same level is simply actuated. In the present case the notching tools are sharp-edged and extend substantially across the entire transition. Obviously, it is also possible to construct the notching tools in such a way that only locally bounded indentations are formed, for example at a few points in the relevant transition area.

After the gap centers of the two magnetic heads 11 and 12 have thus been brought to the same level relative to the reference major surface 17, the supporting plate is secured to the head disc 4 with said reference surface, as is shown in FIG. 7. In principle, it is secured in that area of the basic portion 8 which is remote from the limbs 9 and 10, in order to ensure that the remainder of the supporting plate is not retained. In the present case securing is effected by means of a screw 40 which extends through a bore 45 in the basic portion 8 of the supporting plate 6 and engages a threaded bore 42 in the head disc 4. The magnetic heads 11 and 12, the limbs 9 and 10 carrying these heads, and that part of the basic portion 8 of the supporting plate 6 which essentially faces these limbs 9 and 10 are set free in that the head disc is formed with a recess 43, so that these parts project freely.

After the supporting plate 6 has thus been mounted on the head disc 4, the gap centers of the two magnetic heads 11 and 12 are situated at a level having a distance b from the reference major surface 17 of the basic portion 8 of the supporting plate 6, which level coincides with the radial bounding surface 44 of the head disc 44 to which the supporting plate 6 is secured. It is now assumed that the predetermined level relative to the head disc 4, to which level the gap centres of the two magnetic heads 11 and 12 must be adjusted, must be situated at a distance d from the radial bounding surface 44 of the head disc 4, as is indicated in FIG. 7. For this purpose the head disc 4 is provided with a set-screw 46 in a threaded bore 45, the free end of said screw cooperating with that part of the basic portion 8 of the supporting plate 6 which substantially faces the limbs 9 and 10. Thus, by bending said part of the basic portion 8 of the supporting plate 6 by means of the set-screw 46, as a result of which the two limbs 9 and 10 are adjusted similarly, it is possible to adjust both magnetic heads and their gap centers together to the predetermined level which is situated at a distance d from the radial bounding surface 44 of the head disc 4. As can be seen, this requires only one set-screw 46 which cooperates with the basic portion 8 of the supporting plate 6, which portion is wider than the limbs 9 and 10, which can be effected simply and without any problems as a result of lack of space.

The essential feature of the present method are that the gap centers of the two magnetic heads are brought to the same level relative to a reference surface of the supporting plate and subsequently, after the supporting plate has been secured to the head disc, they are together adjusted to the predetermined level relative to the head disc by means of a set-screw.

What is claimed is:

1. A method of adjusting the gaps of two magnetic heads arranged on one head disc, which heads are disposed adjacent one another in one plane and by means of a common supporting plate are arranged on a head disc which is rotatable in operation, one end portion of the supporting plate being provided with a slot to form two limbs which project from a basic portion of the supporting plate and whose free ends each carry one of the two magnetic heads arranged on the same major surfaces of the limbs, the supporting plate being secured to the head disc with its basic portion after which the gap-length centers of the two magnetic heads are adjusted to be situated at a predetermined level relative to the head disc, characterized in that the distances between the gap-length centers of the two magnetic heads arranged on the limbs of the supporting plate and a major surface of the basic portion of the supporting plate, which major surface constitutes a reference surface and corresponds in level to the major surfaces of the limbs of the supporting plate which carry the magnetic heads, are measured to determine the magnetic head with the smaller distance, after which the basic portion of the supporting plate is retained and a notching tool exerts pressure on the transition between the limb carrying the magnetic head with the smaller distance and the basic portion of the supporting plate from the side which is remote from the magnetic head to offset substantially the entire limb until the gap-length center of the magnetic head on said limb is situated at the same level as the gap-length center of the magnetic head on the other limb, in that subsequently the supporting plate, with the major surface of the basic portion which constitutes the reference surface facing the head disc, is secured to the head disc in that area of the basic portion which is substantially remote from the limb, after which by means of a set-screw acting between that area of the basic portion of the supporting plate which is substantially remote from the limbs and the head disc said area of the basic portion of the supporting plate is bent to adjust both magnetic heads with their gap-length centers together to the predetermined level relative to the head disc.

2. An arrangement for mounting magnetic heads to a head disc two magnetic heads which are situated adjacent one another in a single plane parallel to that of the head disc and which by means of a common supporting plate are arranged on a head disc which is rotatable in operation, characterized in that said supporting plate comprises a basic portion having a pair of limbs extending therefrom, said limbs having free ends carrying the respective heads thereon, said basic portion being fixed to said disc by securing means, said head disc having a threaded bore with a single set screw therein, said set screw bearing against said basic portion between said securing means and said limbs, whereby the gap-length centers of the gaps of both magnetic heads can be adjusted simultaneously in a direction parallel to the axis of the head disc by means of said single set screw to a predetermined level relative to the head disc.

3. A head disc as claimed in claim 2 wherein one of said pair of limbs includes a notch, said notch in said one of said pair of limbs being utilized to adjust the height of said limbs relative to each other before attachment to said head disc.

4. A head disc as claimed in claim 2 wherein said securing means securing said basic portion to said head disc comprises a screw disposed through an aperture in said supporting plate.

* * * * *